(12) United States Patent
De-Milato et al.

(10) Patent No.: US 9,923,400 B2
(45) Date of Patent: Mar. 20, 2018

(54) METHOD OF OPERATING A BATTERY-CHARGER DEVICE, AND CORRESPONDING DEVICE

(71) Applicant: STMicroelectronics S.r.l., Agrate Brianza (IT)

(72) Inventors: Giuliana De-Milato, Francavilla Fontana (IT); Agatino Antonino Alessandro, Riposto (IT); Roberto Salvatore Peluso, Tremestieri Etneo (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 167 days.

(21) Appl. No.: 14/662,881

(22) Filed: Mar. 19, 2015

(65) Prior Publication Data

US 2015/0364934 A1   Dec. 17, 2015

(30) Foreign Application Priority Data

Jun. 12, 2014   (IT) ............................... TO2014A0470

(51) Int. Cl.
*H02J 7/00*       (2006.01)
*H02J 7/04*       (2006.01)

(52) U.S. Cl.
CPC ............ *H02J 7/007* (2013.01); *H02J 7/0052* (2013.01); *H02J 7/0073* (2013.01); *H02J 7/0093* (2013.01); *H02J 7/045* (2013.01)

(58) Field of Classification Search
CPC ................................. H02J 7/007; H02J 7/0052
See application file for complete search history.

(56) References Cited

U.S. PATENT DOCUMENTS

| | | | | |
|---|---|---|---|---|
| 6,333,619 B1* | 12/2001 | Chavez | ................. | H02J 7/0057 320/125 |
| 7,528,574 B1 | 5/2009 | Adkins et al. | | |
| 2002/0008498 A1* | 1/2002 | Tong | .................... | H02J 7/0093 320/141 |
| 2004/0095095 A1* | 5/2004 | Yamamoto | ................ | H02J 7/06 320/128 |
| 2008/0203969 A1 | 8/2008 | Kurihara et al. | | |
| 2008/0203974 A1* | 8/2008 | Manai | ................... | H02J 7/0073 320/160 |
| 2011/0266998 A1 | 11/2011 | Xiao | | |
| 2013/0293186 A1* | 11/2013 | Chou | .................... | H02J 7/0091 320/107 |
| 2015/0188327 A1* | 7/2015 | Ogihara | ................ | H01M 4/505 320/107 |

OTHER PUBLICATIONS

Italian Search Report and Written Opinion for IT TO2014A00470 dated Apr. 23, 2015 (6 pages).

* cited by examiner

*Primary Examiner* — Drew A Dunn
*Assistant Examiner* — Sailesh Thapa
(74) *Attorney, Agent, or Firm* — Gardere Wynne Sewell LLP

(57) ABSTRACT

A battery charger operates in a current regulation mode and a voltage regulation mode. A value of the voltage on the battery being charged is sensed and compared against a target voltage value. The current regulation mode is active during charging while the sensed voltage is less than the target voltage value. When the sensed voltage reaches the target voltage value, the voltage regulation mode is enabled and the current regulation mode is inhibited.

8 Claims, 2 Drawing Sheets

METHOD OF OPERATING A BATTERY-CHARGER DEVICE, AND CORRESPONDING DEVICE

PRIORITY CLAIM

This application claims priority from Italian Application for Patent No. TO2014A000470 filed Jun. 12, 2014, the disclosure of which is incorporated by reference.

TECHNICAL FIELD

The present disclosure relates to devices for charging batteries.

One or more embodiments may refer to devices for charging batteries that can be used in portable electronic devices, such as for example mobile-communication devices or medical devices.

BACKGROUND

A device for charging batteries, commonly referred to as "battery-charger", can manage the operation of charging a battery (electrical accumulator) so as to complete the operation of charging the battery when the latter has reached a specified voltage value, sometimes referred to as $V_{FLT}$ (float voltage).

A device of this kind may comprise various control loops that are able to control parameters such as the charge current, the battery voltage, the input current, etc. so as to manage transfer of energy from the supply source to the battery.

SUMMARY

One of the factors that are able to identify the behavior and performance of a battery-charger device is the charging time, namely, the time used for charging the battery.

One or more embodiments aim at reducing this time.

In an embodiment, a method of operating a battery charger device to charge a battery to a target voltage value, including current regulated operation of the device followed by voltage regulated operation of the device, comprises: sensing the value of the voltage on the battery being charged, comparing the battery voltage value sensed with said target voltage value, and upon the battery voltage value sensed reaching said target voltage value activating said voltage regulated operation while inhibiting said current regulated operation.

In an embodiment, a device for charging batteries to a target voltage value, the device activatable as a current regulator and as a voltage regulator, comprises: a terminal for sensing the value of the voltage of a battery being charged, a comparator for comparing the battery voltage value on said terminal with said target voltage value, the comparator configured for activating said voltage regulated operation and inhibiting said current regulated operation upon the voltage value on said terminal reaching said target voltage value.

The claims form an integral part of the technical disclosure provided herein in relation to the embodiments.

One or more embodiments enable reduction of the charging time of a battery-charger device without this having adverse effects, in particular in terms of safety of the battery.

BRIEF DESCRIPTION OF THE DRAWINGS

One or more embodiments will now be described, purely by way of non-limiting example, with reference to the annexed figures, wherein.

It will be appreciated that, for greater clarity of illustration, the parts that can be seen in the figures are not to be considered necessarily represented in scale.

DETAILED DESCRIPTION

In the ensuing description, various specific details are illustrated aimed at providing an in-depth understanding of examples of one or more embodiments. The embodiments may be obtained without one or more of the specific details, or with other methods, components, materials, etc. In other cases, known structures, materials, or operations are not illustrated or described in detail so that various aspects of the embodiments will not be obscured. Reference to "an embodiment" or "one embodiment" in the framework of this description is intended to indicate that a particular configuration, structure, or characteristic described in relation to the embodiment is comprised in at least one embodiment. Hence, phrases such as "in an embodiment" or "in one embodiment" and the like that may be present in various points of this description do not necessarily refer to one and the same embodiment. Furthermore, particular conformations, structures, or characteristics may be combined adequately in one or more embodiments.

The references used herein are provided only for convenience and hence do not define the sphere of protection or the scope of the embodiments.

Figure 1:
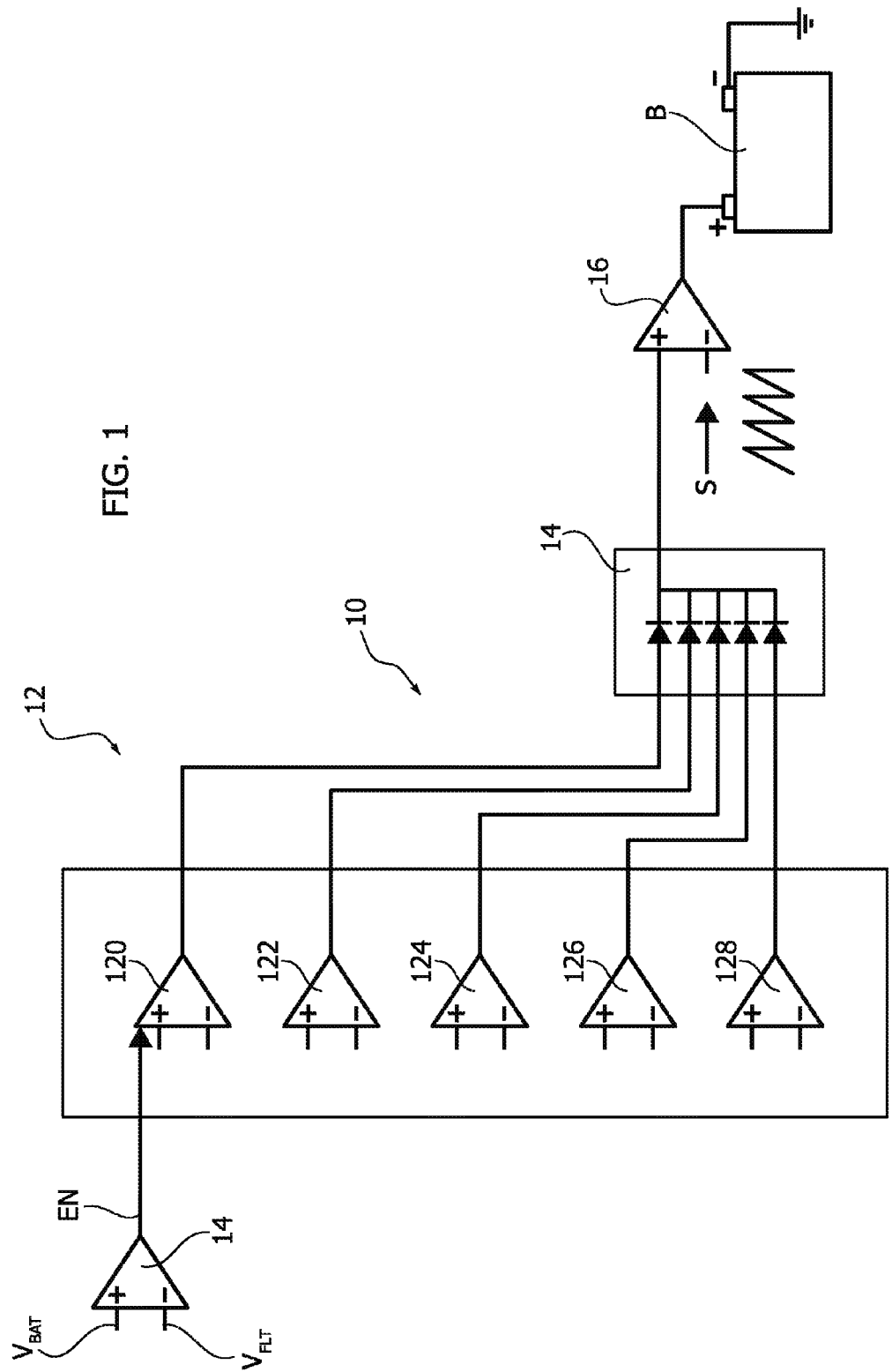
FIG. 1 is a general block diagram of a battery-charger device that is able to incorporate embodiments.

In FIG. 1, the reference 10 designates as a whole a device for charging batteries, or battery charger, the function of which is that of charging a battery (or electrical accumulator) B.

In one or more embodiments, this may be done by controlling the transfer of electrical charge starting from an electrical supply source S that may be constituted, for example, by the power supply grid.

One or more embodiments may be used, for example, for charging batteries B of portable devices, such as for example mobile communication devices or biomedical devices.

For the purposes of the description, in order to provide an understanding of the embodiments, the device 10 can comprise a control block 12 with various loops that are able to act, for example via a selector 14, such as a selector of an analog type, on a control module 16.

In one or more embodiments, the module 16 can control transfer of the electrical energy from the source S to the battery B.

In one or more embodiments, this may be done by resorting to a PWM (Pulse-Width Modulation) scheme, i.e., by modulating the duty cycle of the charge signal applied to the battery so as to regulate selectively, for example, the mean value of the charge current $I_{BAT}$ injected into the battery B.

In one or more embodiments, various control loops may be present in the block 12, such as for example:

- a voltage control loop 120, which is sensitive to the charge voltage $V_{BAT}$ of the battery;
- a current control loop 122, which is sensitive to the intensity of the current $I_{BAT}$ with which the battery is charged;
- a current control loop 124, which is sensitive to the intensity of the input current (i.e., the current drawn from the source S);

a voltage control loop 126, which is sensitive to the input voltage (namely, the voltage of the source S); and a threshold control loop 128, which is sensitive to the internal temperature of the device and that is able to intervene in the case where the temperature of the device rises by lowering the charge current and thus reducing the dissipation of power so as to prevent thermal shut-down.

In the general terms outlined previously, the structure of the device 10 may correspond to a wide range of solutions known in the art, for example from documents such as EP 1,049,229 A1, EP 1,049,230 A1, EP 1,052,758 A1, or EP 1,489,716 A1 (the disclosures of which are incorporated herein by reference).

Figure 2:
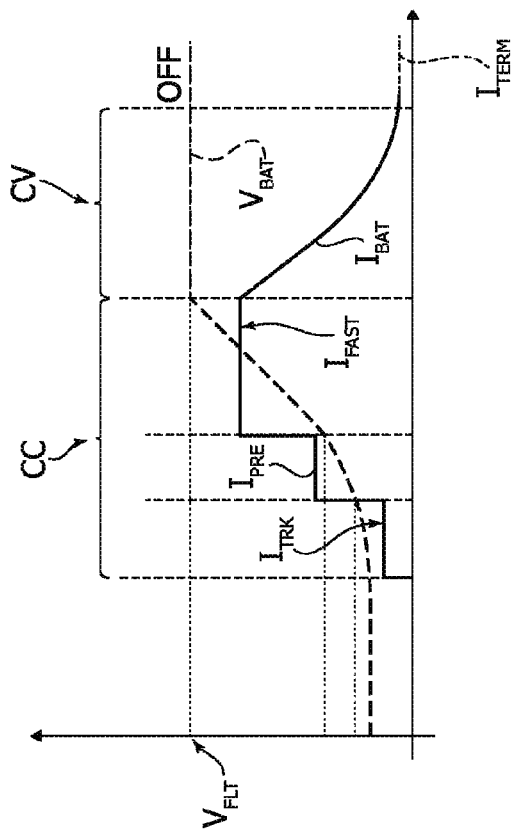

The diagram of FIG. 2 illustrates, schematically and in altogether general terms, a possible time plot of:

the intensity (for example, the average intensity, in the case of a PWM control) of the charge current $I_{BAT}$ delivered to the battery B during the charging process (solid line); and the charging voltage $V_{BAT}$ (dashed line).

In one or more embodiments, in a charging process as exemplified in FIG. 2 two successive steps may be recognized, designated, respectively, by CC and CV, in which the control module 12 (namely, the loops 120 to 128 comprised therein) provides two different operating modes, designated in FIG. 2 by CC and CV.

In a first step (CC), until the value of the voltage on the battery $V_{BAT}$—which initially is "low" (battery flat)—remains below a target value (for example, the value $V_{FLT}$), the device 10 can basically operate as a current generator (regulator), supplying to the battery B charge currents with values (for example, mean values) that are constant, and are possibly increased in stepwise fashion.

For instance, as exemplified in FIG. 2, in this step the device can regulate the intensity of the current at constant (mean) values that are initially equal to a minimum value $I_{TRK}$ (sometimes referred to as trickle-charge level), then equal to a higher value $I_{PRE}$ (pre-charge current), and finally to a maximum value $I_{FAST}$ (fast charging).

The above possible criterion of operation of the battery-charger 10 is here proposed purely by way of example and hence is not to be interpreted, not even indirectly, as constituting a limitation on the embodiments.

In a second step (CV), the device 10 may instead basically function as a voltage generator (regulator), which acts so as to maintain the voltage on the battery $V_{BAT}$ at the target value $V_{FLT}$.

In this step, once again as exemplified in FIG. 2, the current $I_{BAT}$ starts to drop until (for example, via the charge-current loop 122) it is found that the current intensity has achieved a lower threshold value $I_{TERM}$, and the charging process can be terminated (End-Of-Charge or EOC).

In battery-charger devices operating according to the general criteria outlined previously, there may arise a situation of operation such that in the transition between the operating step CC and the operating step CV in actual fact there is an overlapping between the two operating modes of the device.

The result of the above overlapping may be that the charge current $I_{BAT}$ supplied to the battery starts to drop before the voltage on the battery has reached the target value $V_{FLT}$.

This effect (which may be put down to the fact that the control loops of the block 12 cannot present an infinite gain corresponding to their ideal operating model) determines an undesirable increase of the charging time: for a certain time interval (depending upon the capacitance of the battery, the charge current, and other factors) the charge current is in fact lower than the expected value even though the voltage on the battery is still below the target value $V_{FLT}$. In these conditions, the battery is hence charged more slowly than what could the case if the intensity of the charge current is kept at the previous value.

One or more embodiments are able to overcome this drawback by envisaging that the block 12 may be rendered sensitive to an enable signal EN such as to activate the voltage control loop 120 (i.e., the loop activation of which determines operation of the device 10 as voltage regulator) according to the comparison between the voltage $V_{BAT}$ detected across the battery B and the value of the target voltage that is to be reached, for example $V_{FLT}$.

In one or more embodiments, the voltage control loop 120 can be activated (by switching the device 10 from operation as current regulator to operation as voltage regulator) when the voltage on the battery $V_{BAT}$ effectively reaches the target value $V_{FLT}$.

In the representation (which is deliberately schematic) of FIG. 1, the aforesaid operating mode can be implemented by envisaging that the enable signal EN for enabling the loop 120 is issued by a comparator 14, which presents a first input (for example, a positive input) that sensitive to the voltage $V_{BAT}$ across the battery B and a second reference input (for example, a negative input), to which the voltage value $V_{FLT}$ (which may possibly be rendered adjustable) is brought.

Figure 3:
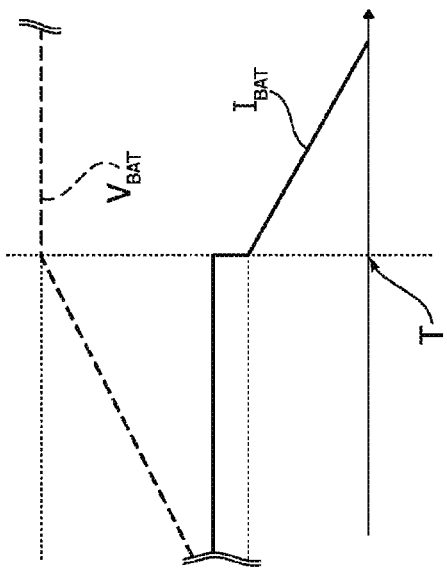
FIGS. 2 and 3 are two time plots representing possible operation of embodiments.

The result that can be achieved according to one or more embodiments is represented in FIG. 3. Here it may be seen that up to an instant of transition T (coinciding with the moment at which the voltage loop 120 is activated, for example by the enable signal EN issued by the comparator 14) the intensity of the current $I_{BAT}$ supplied to the battery B is kept (for example, via the loop 122) at the maximum level, thus preventing an undesirable lengthening of the charging time.

In one or more embodiments, when the value of the battery voltage detected $V_{BAT}$ reaches the target voltage value $V_{FLT}$, the comparator 14 can intervene on the loop 120 for activating operation as voltage regulator (CV in FIG. 2), while operation as current regulator (CC in FIG. 2) is interdicted or inhibited, for example—according to the embodiments—even just as a result of activation of the voltage loop 120.

The fact of using the term "interdicted" or "inhibited," rather than "interrupted," in reference to operation as current regulator is intended to highlight the fact that, in one or more embodiments, operation as current regulator cannot be interrupted directly, for example with the current loop 122 purposely turned off.

In one or more embodiments, when the loop 120 is activated, the battery has already reached the target value $V_{FLT}$, so that, when it is turned on, the loop 120 itself limits the current into the battery, which could otherwise exceed the value $V_{FLT}$.

In fact, in one or more embodiments, various loops like the ones exemplified by the block 12 (except 120) may be made to function always in parallel, for example with the "more limiting" one that prevails and sets the regulation; i.e., each loop monitors a variable or some other parameter and causes this variable not to exceed the regulation value. For example, if, while the device is operating in the mode CC, being regulated by the loop 122, there occurs excessive heating, then the loop 128 can take over from the loop 122 in controlling regulation and can step in to reduce the current. The same may apply to the other loops.

Such a situation may arise with the loop 120, once this is activated by the signal EN.

In this way, i.e., by preventing overlapping of the two operating modes CC and CV of FIG. 2 during transition, it is possible to supply more current to the battery being charged, thus charging it more rapidly without this adversely affecting the safety of the battery.

Of course, the details of construction and the embodiments may vary, even significantly, with respect to what has been illustrated herein purely by way of non-limiting example, without thereby departing from the extent of protection of the invention.

The aforesaid extent of protection is defined by the annexed claims.

The invention claimed is:

1. A method of operating a battery charger device to charge a battery to a final battery voltage value, comprising:
   first charging the battery using a current regulated operation;
   then second charging the battery using a voltage regulated operation;
   further including:
      sensing a value of voltage on the battery being charged,
      comparing the sensed value of the voltage with said final battery voltage value, and
      upon the sensed value of the voltage reaching said final battery voltage value activating said voltage regulated operation and inhibiting said current regulated operation;
   wherein charging the battery using the current regulated operation comprises:
      charging the battery with a first current until the voltage on the battery reaches a first threshold,
      once the voltage on the battery reaches the first threshold, charging the battery with a second current greater than the first current until the voltage on the battery reaches a second threshold, and
      once the voltage on the battery reaches the second threshold, charging the battery with a third current greater than the second current until the voltage on the battery reaches the final battery voltage value, wherein the final battery voltage value is a maximum voltage to which the battery is charged to using the current regulated operation.

2. The method of claim 1, further including:
   sensing a value of charge current fed to the battery,
   comparing the sensed value of charge current with a lower threshold value, and
   discontinuing charging the battery when the sensed value of charge current reaches said lower threshold value.

3. The method of claim 1, further including maintaining an intensity of each of the first current, second current, and third current fed to the battery at respective different constant values during charging with each of the first current, second current, and third current.

4. The method of claim 1, further including feeding the battery with a PWM-modulated charge current, wherein an intensity of the PWM-modulated charge current fed to the battery is an average intensity value which is a function of a pulse width of said PWM modulation.

5. A device for charging a battery to a final battery voltage value, comprising:
   a current regulator,
   a voltage regulator,
   a circuit configured to sense a value of battery voltage during charging,
   a comparator to cooperate with a control module to compare the sensed value of battery voltage with said final battery voltage value, operate said current regulator until the sensed value of the battery voltage reaches the final battery voltage value, and then activate said voltage regulator and inhibit said current regulator when the sensed value of battery voltage reaches said final battery voltage value;
   wherein the comparator cooperates with the control module to operate the current regulator to
      charge the battery with a first current until the voltage on the battery reaches a first threshold,
      once the voltage on the battery reaches the first threshold, charge the battery with a second current greater than the first current until the voltage on the battery reaches a second threshold, and
      once the voltage on the battery reaches the second threshold, charge the battery with a third current greater than the second current until the voltage on the battery reaches the final battery voltage value, wherein the final battery voltage value is a maximum voltage to which the battery is charged to using the current regulator.

6. The device of claim 5, further including:
   a further circuit configured to sense a value of charge current fed to the battery,
   a further comparator configured to compare the sensed value of charge current with a lower threshold value and discontinue charging the battery when the sensed value of charge current reaches said lower threshold value.

7. The device of claim 5, further including circuitry configured to maintain an intensity of each of the first current, second current, and third current fed to the battery at respective different constant values during charging with each of the first current, second current, and third current.

8. The device of claim 5, further including a PWM circuit configured to feed the battery with a PWM-modulated charge current, wherein an intensity of the charge current fed to the battery is an average intensity value which is a function of a pulse width of said PWM modulation.

* * * * *